United States Patent
Kolam et al.

(10) Patent No.: US 10,042,948 B2
(45) Date of Patent: Aug. 7, 2018

(54) IDENTIFYING CORRELATED COMPONENTS OF DYNAMIC CONTENT

(71) Applicant: Instart Logic, Inc., Palo Alto, CA (US)

(72) Inventors: Hariharan Kolam, Palo Alto, CA (US); Peter Blum, Palo Alto, CA (US)

(73) Assignee: Instart Logic, Inc., Palo Alto, CA (US)

( * ) Notice: Subject to any disclaimer, the term of this patent is extended or adjusted under 35 U.S.C. 154(b) by 0 days.

(21) Appl. No.: 15/144,599

(22) Filed: May 2, 2016

(65) Prior Publication Data

US 2016/0246895 A1 Aug. 25, 2016

Related U.S. Application Data

(63) Continuation of application No. 14/644,802, filed on Mar. 11, 2015, now Pat. No. 9,363,329, and a continuation-in-part of application No. 13/836,512, filed on Mar. 15, 2013.

(60) Provisional application No. 62/176,879, filed on Mar. 3, 2015.

(51) Int. Cl.
*G06F 15/167* (2006.01)
*G06F 17/30* (2006.01)
*H04L 29/08* (2006.01)

(52) U.S. Cl.
CPC ........ *G06F 17/30902* (2013.01); *H04L 67/02* (2013.01); *H04L 67/1097* (2013.01); *H04L 67/2842* (2013.01)

(58) Field of Classification Search
CPC .. H04L 67/2842; H04L 67/1097; H04L 67/02
See application file for complete search history.

(56) References Cited

U.S. PATENT DOCUMENTS

| | | | |
|---|---|---|---|
| 7,627,479 B2* | 12/2009 | Travieso | G06F 17/289 704/2 |
| 9,456,050 B1 | 9/2016 | Lepeska | |
| 2002/0073301 A1 | 6/2002 | Kahle | |
| 2002/0099807 A1 | 7/2002 | Doyle | |
| 2003/0004272 A1 | 1/2003 | Power | |
| 2003/0177175 A1 | 9/2003 | Worley | |
| 2004/0064682 A1 | 4/2004 | Nguyen | |
| 2005/0188048 A1 | 8/2005 | Yuan et al. | |
| 2006/0031404 A1 | 2/2006 | Kassab | |
| 2007/0101061 A1* | 5/2007 | Baskaran | G06F 17/30902 711/118 |
| 2007/0162927 A1* | 7/2007 | Ramaswamy | G11B 27/28 725/36 |
| 2007/0289026 A1* | 12/2007 | Newcombe | G06Q 20/3674 726/29 |
| 2008/0133722 A1 | 6/2008 | Ramasundaram et al. | |
| 2008/0320225 A1* | 12/2008 | Panzer | G06F 17/30902 711/130 |
| 2009/0254707 A1* | 10/2009 | Alstad | G06F 17/30902 711/118 |

(Continued)

*Primary Examiner* — Yves Dalencourt
(74) *Attorney, Agent, or Firm* — Van Pelt, Yi & James LLP

(57) ABSTRACT

A content tag is translated. Dynamic content that includes one or more identification tags identifying one or more cacheable portions of the dynamic content is received. The one or more identification tags within the received dynamic content are translated to generate a conventional version of the received dynamic content. The generated conventional version of the received dynamic content are provided.

20 Claims, 7 Drawing Sheets

(56) References Cited

U.S. PATENT DOCUMENTS

| | | |
|---|---|---|
| 2009/0276488 A1 | 11/2009 | Alstad |
| 2010/0023582 A1 | 1/2010 | Pedersen et al. |
| 2010/0138485 A1 | 6/2010 | Chow et al. |
| 2012/0144126 A1 | 6/2012 | Nimmala |
| 2012/0185835 A1 | 7/2012 | Klots |
| 2012/0284356 A1 | 11/2012 | Luna |
| 2012/0303697 A1 | 11/2012 | Alstad |
| 2013/0226992 A1 | 8/2013 | Bapst |
| 2014/0052811 A1 | 2/2014 | Lewin et al. |
| 2014/0095990 A1* | 4/2014 | Blanchard ............... G06F 17/24 715/255 |
| 2014/0149850 A1 | 5/2014 | Khorashadi et al. |
| 2014/0237066 A1 | 8/2014 | Fainberg et al. |
| 2014/0344452 A1 | 11/2014 | Lipstone et al. |
| 2015/0032803 A1 | 1/2015 | Graham-Cumming et al. |
| 2015/0263977 A1* | 9/2015 | Nair ....................... H04L 47/70 709/226 |
| 2017/0264701 A1 | 9/2017 | Wei |

* cited by examiner

```
<html>
  <head>
    <title>Welcome</title>
  </head>
  <body>
    <h1>HelloWorld </h1>
         .
         .
         .
    <img src = "url for image"/>
    <video>
       <source src = "url for video" type = "video/ogg"  />
    </video>
    <script type = "text/javascript">
    <!--script
    *** Some javascript code is placed here ***
    -- >
    </script>
  </body>
</html>
```

Script

FIG. 2

IDENTIFYING CORRELATED COMPONENTS OF DYNAMIC CONTENT

CROSS REFERENCE TO OTHER APPLICATIONS

This application is a continuation of co-pending U.S. patent application Ser. No. 14/644,802 entitled IDENTIFYING CORRELATED COMPONENTS OF DYNAMIC CONTENT, filed Mar. 11, 2015, which claims priority to U.S. Provisional Application No. 62/176,879, entitled PROVISIONAL EXECUTION OF DYNAMIC CONTENT COMPONENT, filed Mar. 3, 2015, both of which are incorporated herein by reference for all purposes.

U.S. patent application Ser. No. 14/644,802 entitled IDENTIFYING CORRELATED COMPONENTS OF DYNAMIC CONTENT, filed Mar. 11, 2015, is a continuation in part of co-pending U.S. patent application Ser. No. 13/836,512, entitled EFFICIENT DELIVERY OF WEBPAGES, filed Mar. 15, 2013, which is incorporated herein by reference for all purposes.

BACKGROUND OF THE INVENTION

Typically a webpage that includes dynamic content that may change over time is not cacheable. Thus the dynamic webpage is requested from an origin content source every time the dynamic webpage is requested by a user. The wait time experienced by an end-user includes the time it takes for the origin content source to generate the dynamic webpage as well as the transit time it take to request and receive the content. This wait time can be long and may contribute a negative user experience. Therefore, improved techniques for delivering information are desirable.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

DETAILED DESCRIPTION

Figure 1:
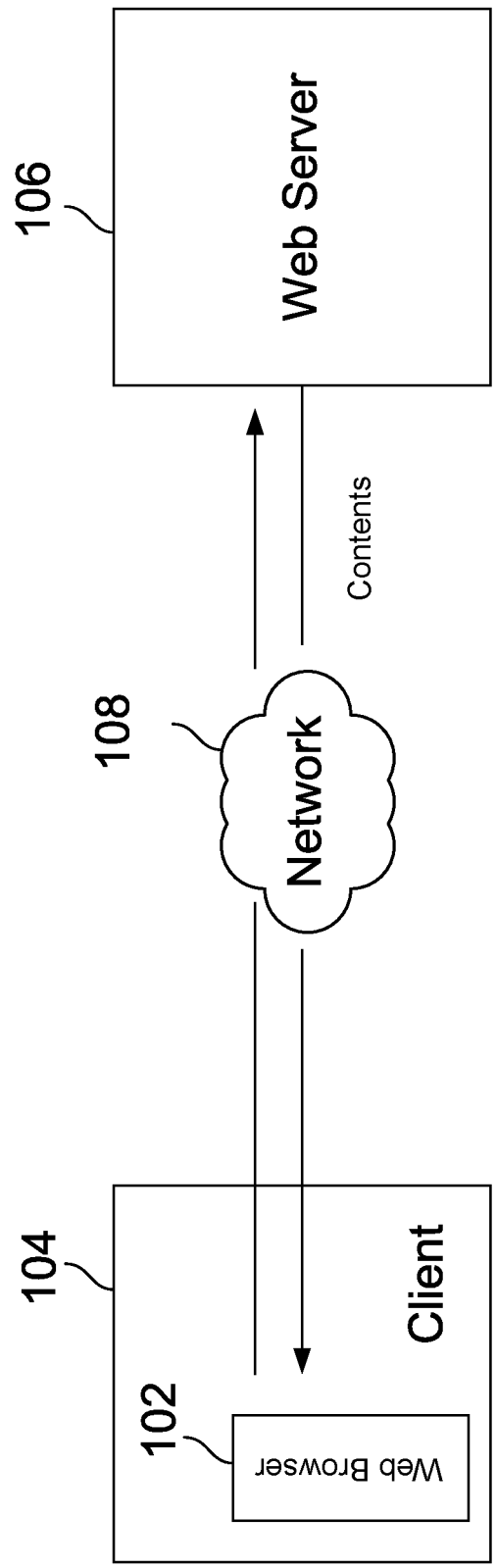
FIG. 1 is a block diagram illustrating an embodiment of a web browser accessing webpages and other information through a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Identifying content correlation is disclosed. In some embodiments, content requests are monitored at a server. For example, an edge server of a content delivery network monitors requests by clients for content. The edge server may be serving a proxy for the requests. The server also monitors the responses to the requests. For example, the edge server monitors responses received from content origin servers in response to the client content requests.

In some embodiments, it is determined that requested content in response to the requests is correlated over a plurality of content requests for content located at the same content location. The requested and received content may be dynamic content and an edge server may be unable to cache the entire requested content. However, it may take a relatively long time for the origin to receive the request, dynamically generate the requested content, and send the requested content via a network. Thus if a server (e.g., edge server) that received the initial request is able to quickly provide to the client a portion of the requested data that will be likely included in the requested data received from the content origin, the client has a head start on receiving and processing the content. In some embodiments, correlating the responses includes identifying portions of each response that likely will not change for subsequent requests for the same content (e.g., request for the same webpage) and that can be cached by an intermediary server to quickly provide to a client prior to receiving the requested content from the content origin. The cacheable portion may be identified as executable content (e.g., JavaScript) and may be provided to the client for pre-execution prior to receiving the requested content from the content origin.

In some embodiments, rather than attempting to only automatically identify which portion of the requested content is cacheable and/or pre-executable, one or more portions of the requested content have been explicitly tagged/identified as cacheable and or pre-executable. For example, a developer or other user/system has identified portions of the requested content with identifier tags to explicitly identify cacheable and/or pre-executable portions of the requested content. The explicitly identified portions may be cached and/or pre-executed. However, these tags/identifiers may be included in the requested content as custom tags/identifiers (e.g., does not conform to HTML or other standardized protocol/language understood by a web browser) that cannot be understood/processed by an end client. Thus the tags/identifiers may need to be translated and/or removed from the requested content before being cached and/or provided to the client. For example, content tagged using custom/non-standard tags that identify the ability to be cached/pre-executed are translated to conventional standardized tags able to be processed by a client (e.g., understood by a standard web browser).

Expediting content delivery is disclosed. In some embodiments, a request for content is received at a server. For example, an edge server of a content delivery network receives a request for a webpage from a client. The requested content of the client may include dynamic content components that may dynamically change and the edge server may be unable to cache the entire requested content. In some embodiments, once the request for content is received by the server, the content is requested by the server from an origin. It may take a relatively long time for the origin to receive the request, dynamically generate the requested content, and send the requested content via a network that may be slow. Thus if the server (e.g., edge server) that received the initial request is able to quickly provide to the client a portion of the requested data that will be likely included in the requested data, the client has a head start on receiving and processing the content. In some embodiments, components of dynamic content that likely will not change are identified and cached. However, because the cached components could still change from one request to another, the special handling is required in the event a cached component that has been provided in response to a request is not valid.

In some embodiments, it is determined that a cached subset of the requested content includes at least some cached executable content. For example, it is determined that a JavaScript content component of the requested content that has been cached is included. The cached subset of the content is sent to a client for provisional execution. For example, the cached JavaScript content component that has been cached by a proxy/edge server is provided to the client to allow the client to start pre-execution of the JavaScript.

However, the cached subset that was provided for pre-execution may have changed since being cached and different content may be received from a content origin source. For example, in response to a request by the proxy server from the origin source for the requested dynamic content, updated dynamic content is received that does not include the cached subset provided for pre-execution. In some embodiments, it is determined that a change in the requested content may invalidate the provisional pre-execution and the client is instructed to abandon the provisional pre-execution. For example, the provisional pre-execution of the cached subset was executed by the client in a separate worker thread (e.g., in a protected/sandbox area of a separate hidden web browser tab thread) that may be discarded to invalidate the provisional pre-execution. In some embodiments, if it is determined that the cached subset is confirmed to be included in the requested content, the provisional pre-execution is made permanent. For example, a result of a provisional pre-execution of the cached subset that was executed by the client in a separate worker thread is merged/included in a main browser thread (e.g., document object model elements combined).

FIG. 1 is a block diagram illustrating an embodiment of a web browser accessing webpages and other information through a network. As shown in FIG. 1, a web browser 102 of client 104 is connected to a server 106 (e.g., an edge server) through a network 108. Network 108 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 106 requesting the HTML webpage file. After server 106 locates the requested HTML webpage file, server 106 returns the requested HTML webpage file in an HTTP response message to web browser 102. As web browser 102 begins to render the webpage on a screen, web browser 102 parses the received webpage file and builds a data structure to represent the various components and resources of the webpage in a local memory.

Since the network latency associated with different types of networks varies widely, and web browser 102 needs to receive webpage 200 and its dependent resources before web browser 102 can complete the rendering of webpage 200, the startup wait time experienced by the end-user of the browsing session may be insignificant in low-latency networks, such as Wi-Fi networks, but unacceptably long for an end-user in higher-latency networks, such as 3G networks. Traditionally by caching content such as webpages or webpage components close to a requestor of the content, the content can be quickly retrieved from the cache rather than the origin server, saving bandwidth and time. However, caching is of limited value when requested content is dynamic, such that cached content is likely to change after the content was last cached. Once cached content has changed, the cached content must be discarded and updated content must be retrieved from the origin server. Therefore, when at least a portion of content is dynamic, the content is typically not cacheable. Therefore, improved techniques for delivering information are desirable.

Webpage content may include executable content such as the script shown in webpage 200. Examples of executable content include a script, a program, a web program/script, JavaScript, and any other program code. As compared to non-executable content, executable content requires extra processing time and resources to load and process the executable code. Executing the executable content may even require processing tasks such as DNS lookup and TCP connection establishment that consumes processing resources and time. However, once a client requests a webpage, the client may be sitting idle while waiting for the requested content to be provided for processing/rendering. It would be desirable to be able to provide at least a portion of the requested content as soon as possible to the requesting client to allow the client to utilize its idle resources as soon as possible to reduce the overall processing/rendering time.

Figure 3:
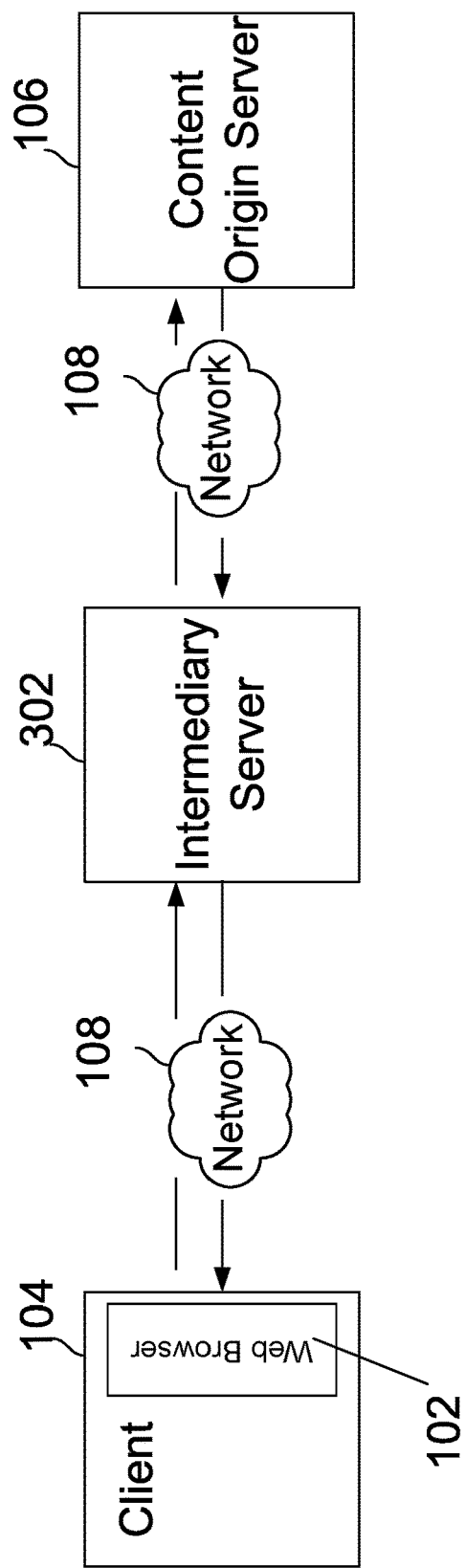
FIG. 3 is a block diagram illustrating an embodiment of an optimized content delivery environment.
Figure 4:
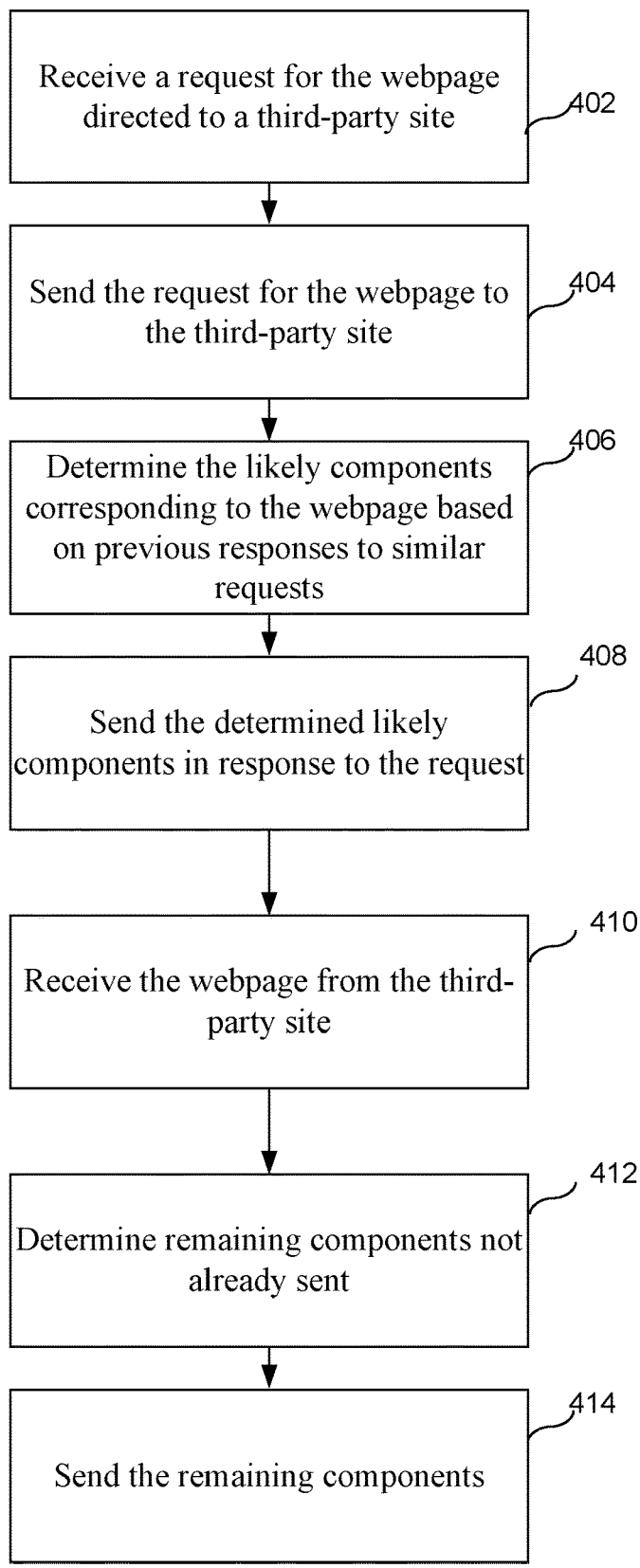
FIG. 4 is a flow chart illustrating an embodiment of a process for delivering a webpage with dynamic content.

FIG. 3 is a block diagram illustrating an embodiment of an optimized content delivery environment. FIG. 4 is a flow chart illustrating an embodiment of a process for delivering a webpage with dynamic content. In some embodiments, the process of FIG. 4 is implemented on intermediary server 302 of FIG. 3.

Continuing with the HTML webpage illustrative example above, when web browser 102 sends an HTTP request message requesting for the HTML webpage, the HTTP request message is received by intermediary server 302. In some embodiments, intermediary server 302 is an edge server that belongs to a content delivery network or content distribution network (CDN). In some embodiments, intermediary server 302 is a proxy server.

Intermediary server 302 may cache content to be provided to client 104. For example, intermediary server 302 is a caching proxy server that caches content from origin server 106. When client 104 requests data of origin server 106, intermediary server 302 is able to provide the requested data from its cache rather than obtaining the data from origin server 106 if the requested content has been cached by intermediary server 302. Because intermediary server 302 is located closer to client 104 and may be servicing a fewer number of requestors, intermediary server 302 is able to provide requested content faster than origin server 106. However, intermediary server 302 may not be able to cache every type of content of origin server 106. For example, dynamic content of origin server 106 (e.g., dynamic webpage) is typically unable to be cached because the content may change after the dynamic content has been cached. However, although dynamic content such as a dynamic webpage in its entirety may be uncacheable, the dynamic content often includes components that may not change or may infrequently change over time. These relatively static portions may be cached.

After receiving the HTTP request message, intermediary server 302 forwards the HTTP request message to a third-party site (e.g., origin server 106) and waits for the HTML webpage in an HTTP response message, which is expected to be sent by origin server 106 in response to the HTTP request message (see step 404).

Without waiting for the arrival of the HTTP response message from origin server 106, intermediary server 302 may generate a temporary webpage (hereinafter referred to as the fast-delivery webpage) based on profiling information corresponding to the requested webpage (see step 406) and send the fast-delivery webpage to web browser 102 (see step 408). The fast-delivery webpage generated by intermediary server 302 includes information and resources that intermediary server 302 predicts web browser 102 would actually receive or need to further download had the actual webpage been received by web browser 102. Once web browser 102 begins to receive the fast-delivery webpage from intermediary server 302, web browser 102 no longer needs to stay idle, but is unblocked from handling different tasks. For example, web browser 102 may begin to process any information included in the fast-delivery webpage or load some of the information onto memory, or begin to initiate any further downloading of dependent resources, including images, videos, audio clips, and the like.

In some embodiments, the fast-delivery webpage includes an injected nanovisor program component that may manage received content, process received content, obtain dependent resources, modify a webpage, and/or modify/virtualize a DOM (Document Object Model) of the webpage. For example, webpage components or other information and resources related to the webpages that are sent to web browser 102 may be intercepted, filtered, processed, or provided by the nanovisor. The nanovisor may be coded in a managed programming language (e.g., runs in a Common Language Runtime) such as JavaScript, Java, .Net, etc. In some embodiments, the nanovisor may be injected by adding JavaScript code in the head section of an HTML webpage file. In some embodiments, the nanovisor may be included into the fast-delivery webpage using standards-based (e.g., HTML, JavaScript, ActionScript, etc.) code. For example, intermediary server 302 may inject a nanovisor program component into the fast-delivery webpage and the response back to web browser 102. In some embodiments, the nanovisor may have been already included in content received from a content origin (e.g., included by server 106).

In some embodiments, the nanovisor may manage pre-execution of executable content components. For example, when cached executable content of a dynamic webpage is received for pre-execution, the provisional pre-execution of executable content may need to be discarded in the event the pre-executed content is determined to be no longer valid. The nanovisor may coordinate the pre-execution by allowing the pre-execution to take place in a separate protected environment (e.g., within a worker thread of a separate hidden tab environment of a web browser) before allowing the results of the pre-execution to be included in a main environment (e.g., main thread of a main browser tab) or discarded based on whether the cached content of the pre-execution has been confirmed as valid or invalid.

In some embodiments, method API calls by web browser 102 or any JavaScript code to manipulate the objects in a DOM tree may be intercepted, processed, or modified by the nanovisor. The nanovisor may also manipulate the DOM tree by making the appropriate method API calls to the DOM tree. As a result, the nanovisor may allow a virtualization engine for the DOM of web browser 102. The virtualization engine may access and manipulate a DOM tree, including the creation, deletion, or update of nodes within the DOM tree to enable optimized content delivery using intermediary server 302 as compared to normal content delivery system server 106. In some embodiments, one or more resources requested using a dynamic request (e.g., request made via JavaScript) may be intercepted and handled by a client such as the nanovisor due to the client's ability to handle and intercept resource requests. For example, the nanovisor is able to reorder, prefetch, and/or provide a cached version of one or more resources of a webpage requested using a dynamic request.

Virtualization of the DOM of web browser 102 may be applicable to different types of optimization. In some embodiments, using the virtualization engine, optimized delivery of information over a network by segmentation and reprioritization of downloaded information can be achieved. For example, using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage without compromising the end-user's experience. In some embodiments, the virtualization of the DOM of web browser 102 is transparent to web browser 102. In some embodiments, the virtualization of the DOM of web browser 102 is also transparent to the end-users. The end-users are not required to install any plugins. In some embodiments, the virtualization of the DOM of web browser 102 is also transparent to the content publishers, without requiring the content publishers to change any codes.

Intermediary server 302 continues to wait for the actual HTML webpage in an HTTP response message, which is expected to be sent by web server 106 in response to the HTTP request message. When the HTTP response message is finally generated and sent by web server 106, intermediary server 302 intercepts the HTTP response message (see step 410). Intermediary server 302 scans and processes the received webpage, and determines any additional or updated information that needs to be sent to web browser 102 for rendering the actual HTML webpage (see step 412). Intermediary server 302 then completes the response to web browser 102 by sending the additional information to web browser 102, such that web browser 102 may complete the rendering of the actual HTML webpage (see step 414).

In one illustrative example, intermediary server 302 receives a request from an end-user trying to access an online merchant's website. Intermediary server 302 makes a prediction that web server 106 would send back certain information to web browser 102 based on profiling. Intermediary server 302 may immediately send certain content to web browser 102, while web server 106 runs in parallel to obtain and return the remainder of the dynamic content. Intermediary server 302 then relays the remaining dynamic content to web browser 102 when the content becomes available to intermediary server 302.

In the above illustrative example, the original HTML webpage of the web site may take web server 106 a significant period of time to generate. The original HTML webpage is thus deconstructed into two parts: the first part is sent by intermediary server 302 to web browser 102 without delay, and the second part is the entire webpage minus the first part that has already been sent by intermediary server 302. Because web browser 102 can begin to parse the first part of the webpage immediately on receipt without waiting for the second part to arrive, web browser 102 may take further actions, including initiating any further downloading of dependent resources, loading JavaScript onto the memory, pre-executing executable content, and the like. The above described technique enables more efficient use of both bandwidth and computing resources by reducing the idling time within which bandwidth and computing resources are unutilized.

In some embodiments, the generation of the fast-delivery webpage is based at least in part on profiling information collected by intermediary server 302 in relation to the requested webpage. The process of profiling may include determining the static content (e.g., not dynamic content) of the requested webpage and predicting at least some of the dynamic content of the requested webpage. Since the static content of the requested webpage is likely present in the webpage, the static content may be embedded in the fast-delivery webpage and sent to web browser 102 without further delay. Examples of static content include web templates, website or company logos, and the like.

The fast-delivery webpage may also include dynamic content. For example, intermediary server 302 may analyze and profile the content and the generation of the requested webpage based on many users. The analysis and profiling may be performed on a per-user basis or per-group basis. By continuously examining the pattern for a large number of users accessing the particular webpage, intermediary server 302 may predict the dynamic content that is going to be included in the actual webpage generated by web server 106, or the dependent resources that the actual webpage is going to direct web browser 102 to further download, or the data that is going to be loaded in response to the parsing or rendering of the actual webpage. Based on these predictions, intermediary server 302 may identify cacheable and/or pre-executable content components. For example, the fast-delivery webpage may include the predicted cached dynamic pre-executable content components. The fast-delivery webpage may also include code (e.g., JavaScript, ActionScripts, etc.) to cause web browser 102 to preload certain data into memory or cache, or cause web browser 102 to download additional resources. In some embodiments, the prediction of which content components to cache/pre-execute may be aided by analyzing the number of confirmations and/or abandonments as a result of correctly and/or incorrectly identifying content for caching/pre-execution. In some embodiments, the content/webpage provided by a content provider (e.g., provided by server 106) has been coded/marked to identify specific content components that may be cached and/or pre-executed. For example, a developer may tag components of a webpage to identify that the tagged components are safe to cache and/or pre-execute.

The fast-delivery webpage may include any elements that can be included in a typical webpage. For example, the fast-delivery webpage may include some or all of the elements as illustrated in FIG. 2, including the <head>, <title>, <body> tags, and the like.

In some embodiments, chunked transfer encoding is used to transfer updated or additional information of the requested webpage to web browser 102 once the information is returned to intermediary server 302 by web server 106. Chunked transfer encoding is a data transfer mechanism in version 1.1 of HTTP wherein data is sent in a series of "chunks." The mechanism uses the Transfer-Encoding HTTP header in place of the Content-Length header, which the protocol would otherwise require. Because the Content-Length header is not used, the sender does not need to know the length of the content before it starts transmitting a response to the receiver; senders can begin transmitting dynamically-generated content before knowing the total size of that content. The size of each chunk is sent right before the chunk itself, so that the receiver can tell when it has finished receiving data for that chunk. The data transfer is terminated by a final chunk of length zero.

For example, intermediary server 302 may use chunked transfer encoding to send the static content and predicted dynamic content corresponding to the requested webpage in a series of initial "chunks" to web browser 102. The remainder of the requested webpage may be sent to web browser 102 in a series of subsequent "chunks." When all the information corresponding to the requested webpage has been sent, the data transfer is terminated by a final chunk of length zero.

In some cases, the initial "chunks" of the fast-delivery webpage may include content that is unnecessary or incorrect. In one example, the fast-delivery webpage includes extra content that is not present in the actual webpage or the fast-delivery webpage includes code that causes web browser 102 to preload or download data that is unnecessary. In another example, the fast-delivery webpage includes content that is inconsistent with the content present in the actual webpage or the fast-delivery webpage includes codes that cause web browser 102 to preload or download incorrect data.

To handle these cases, intermediary server 302 may further determine whether there are any side-effects or errors associated with the extraneous or incorrect content. Based on different criteria, intermediary server 302 may make a determination as to whether further actions should be taken to undo or correct any effects caused by the extraneous content. The criteria considered may include the time and computation resources required to correct the effects, the degree of severity of the errors or side-effects, the extent to which the side-effects and errors are perceivable by the end-users, and the like. In one embodiment, if the side-effect or errors are determined to be objectionable to the end-users, web browser 102 may be directed to refresh or reload the webpage again.

In another example, the initial "chunks" of the fast-delivery webpage lack a Set-Cookie header, which is present in the actual webpage generated by web server 106. HTTP cookies provide the server with a mechanism to store and retrieve state information on the client application's system. This mechanism allows web-based applications the ability to store information about selected items, user preferences, registration information, and other information that can be retrieved later. The Set-Cookie header is sent by the server in response to an HTTP request, and used to create a cookie on the user's system. In some embodiments, intermediary server 302 scans the HTTP response message from web server 106 for any Set-Cookie header. If a Set-Cookie header is found, then intermediary server 302 may add code (e.g., JavaScript) in the subsequent "chunks" of the fast-delivery webpage to set the cookie.

In some cases, sending certain types of content ahead of time in the fast-delivery webpage may cause side-effects, including triggering out-of-sequence events or triggering unintended events to happen. Some webpages may include Adobe Flash file format (SWF) files, and an embedded SWF file may include additional SWF files within itself. For example, a main SWF file embedded in a webpage may load other SWF files, e.g., SWF2 file, SWF3 file, and so on. If the SWF2 file or the SWF3 file is sent ahead of the main SWF file by intermediary server 302, web browser 102 will create the document object model (DOM) objects corresponding to those files. For example, if the SWF2 file includes an audio clip, web browser 102 will play the audio immediately as a result of the prefetching, causing unexpected side-effects.

In some embodiments, code may be used to selectively suppress or prevent certain effects that are caused by the content being sent in advance in the fast-delivery webpage. For example, the content sent in the fast-delivery webpage may be the audio portion of a multimedia presentation, and should not be played until the download of the entire presentation is complete. In one embodiment, the SWF files (e.g., the SWF2 and SWF3 files) that are sent in advance in a fast-delivery webpage are placed within an iframe. The <iframe> tag specifies an inline frame which is used to embed another document within the current HTML document. Attributes of the iframe may be set in such a way that some of the functions or features are disabled; for example, an attribute may be set to turn off visibility. When web browser 102 renders this iframe with the visibility attribute set to OFF, the SWF files (i.e., SWF2 and SWF3 files) embedded within the iframe are merely loaded into the local cache. When the main SWF file is received by intermediary server 302, intermediary server 302 may send it to web browser 102. Web browser 102 then loads the main SWF, and when the main SWF file needs to load SWF2, and SWF2 needs to load SWF3, all of those dependent SWF files can be fetched from the local cache rather than from across the network. Rendering of the content of the iframe can be enabled again by deleting the iframe or setting the visibility attribute to ON.

In some embodiments, a browser cache of browser 102 stores content that can be utilized by browser 102 to render web content instead of obtaining the content via network 108. For example, if the desired content of browser 102 is locally stored in a cache of the machine running browser 102, it would be faster to obtain the content locally rather than via a network request. In some embodiments, one or more resources of a webpage/web content desired to be rendered by browser 102 are preloaded in a browser cache prior to the original code of the webpage/web content requesting the resource. Thus when the preloaded content is needed/requested by the original code, the requested content is already in the cache for immediate use rather than requiring a request to be made via a network for the requested content.

In some embodiments, the order of components of a webpage/web content to be loaded and/or executed is reorganized in an optimized order. Obtaining resources and/or executing executable content in a specified order of the original code of the webpage/web content may not be optimal for rendering the webpage/web content as soon as possible. In some embodiments, the ordering in which components should be obtained/executed is reordered and optimized based at least in part on one or more of the following: an order of resources requested/executed for the webpage, an observed order of components placed in a DOM, sizes of the components, a maximum number of possible concurrent connections, a parameter/setting of the browser being utilized, a type of browser being utilized, visual importance of the components, utilization frequencies of the components, and other properties/information about the components. The reordering may be facilitated by a nanovisor and/or intermediary server 302 that reorders code, components, and/or execution process of the web content to achieve the desired ordering.

Figure 5:
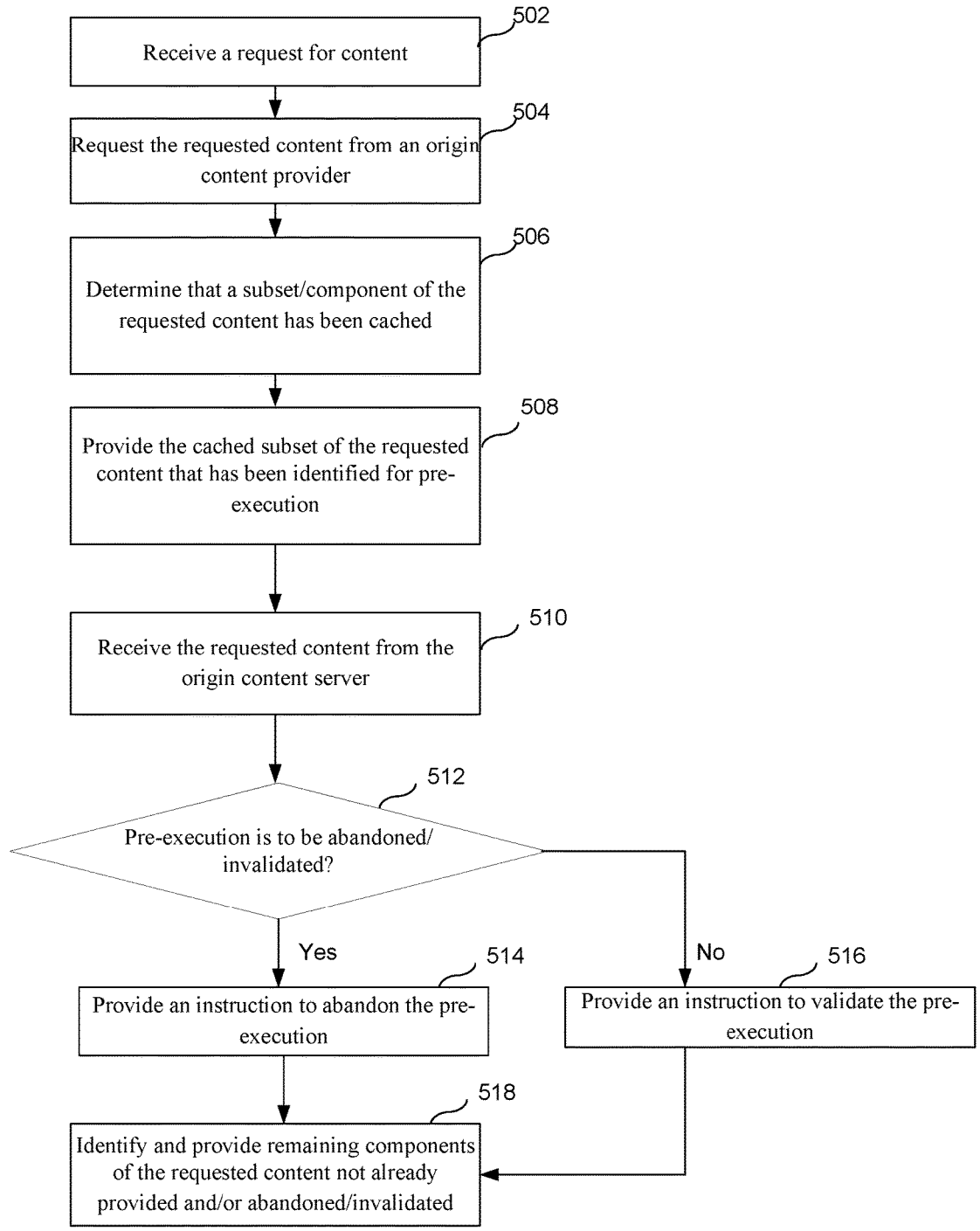
FIG. 5 is a flow chart illustrating an embodiment of a process for pre-executing an executable content component of a dynamic content.

FIG. 5 is a flow chart illustrating an embodiment of a process for pre-executing an executable content component of a dynamic content. In some embodiments, the process of FIG. 5 is implemented on intermediary server 302 of FIG. 3.

At 502, a request for content is received. In some embodiments, the request is a request for web content (e.g., webpage) from a client. For example, web browser 102 of FIG. 3 requests a webpage and the request is received by intermediary server 302. In some embodiments, the request is the request received in 402. In some embodiments, the request is a request for dynamic content. For example, using an identifier of the requested content (e.g., URI), the request is identified as content that is dynamic. In some embodiments, the requested content is received at a proxy/cache server (e.g., edge server of a CDN) due to content redirection achieved using DNS redirection. For example, a host name of a URI of the requested content is mapped to the IP address of the proxy/cache server instead of the original origin server. The DNS redirection may be achieved by updating/modifying a routing table of a DNS server to map the host name to the IP address of the proxy/cache server.

At 504, the requested content is requested from an origin content provider. For example, intermediary server 302 sends a request for the requested content to server 106 of FIG. 3. In some embodiments, the origin content provider may be an origin server, a mirror of an origin server, a third-party server, and/or any other server that is able to dynamically generate and/or provide a valid version of the requested content. In some embodiments, requesting the content includes sending a new request for the content to the origin content server. In some embodiments, the requesting the content includes forwarding at least a portion of the received request to the origin content server. In some embodiments, the requested content is requested from the origin content provider in response to a determination that the requested content includes dynamic content. In some embodiments, the requested content is requested from the origin server in response to a determination that the requested content has not been completely cached. For example, it is determined that the entire requested content has not been cached and/or a valid cached version of the requested content is not stored in the cache (e.g., cached version has expired).

At 506, it is determined that a subset/component of the requested content has been cached. For example, an executable content component of the requested content has been cached to allow pre-execution of the executable content component. In some embodiments, pre-execution of the executable content component includes allowing execution of executable content prior to determining that the executable content component is still valid. In some embodiments, pre-execution of the executable content component includes allowing execution of executable content prior to receiving the executable content component from an origin content provider. In some embodiments, pre-execution of the executable content component includes allowing execution of executable content prior to receiving the entire requested content that includes the executable content component.

The cached executable content component may have been identified by analyzing previous requests and responses to the same requested content. In some embodiments, the content has been previously received and the executable component had been marked in the previously received content as cacheable and pre-executable. In some embodiments, determining that the subset of the requested content has been cached includes determining whether any component of the requested content identified by an identifier included in the request has been cached in a cache of an edge server (e.g., whether cached in intermediary server 302 of FIG. 3) and is valid (e.g., Time-to-live (TTL) has not expired for the cached content component). In some embodiments, it is determined whether a cached component of the requested component has been identified as pre-executable. For example, in the event the executable content subset is cached but not marked as pre-executable, the cached executable content subset may be provided but not executed until the cached executable content subset has been confirmed as valid. In some embodiments, the cached subset is identified as executable if the cached subset includes code/script content. For example, executable content includes executable code/script content such as JavaScript, Java, ActionScript, .Net, etc.

In some embodiments, the subset of the requested content has been cached for either committed pre-execution or provisional pre-execution. For example, the cached content subset is identified as pre-executable in a committed state because the content component has been confirmed (e.g., by a developer) as pre-executable without ever needing to be invalidated due to change in requested dynamic content. In another example, the cached content subset is identified as only provisionally pre-executable because the cached content subset has been automatically identified by a proxy server and the cached content subset may be invalidated due to a change in the requested dynamic content. In some embodiments, in the event the subset of the requested content has been cached for committed pre-execution, the subset is allowed to execute by a client without the ability to invalidate the pre-execution. For example, the subset is allowed to execute within the main browser context environment (e.g., in a main thread environment and not in a protected/sandboxed environment). In some embodiments, in the event the subset of the requested content has been cached for only provisional pre-execution, the subset is allowed to execute by a client in a separate protected environment that may be separately invalidated in the event the subset had changed to update of the requested dynamic content. For example, the subset is allowed to execute within a separate browser context environment (e.g., in a protected sandboxed environment of a separate thread and not in a main thread).

At 508, the cached subset of the requested content that has been identified for pre-execution is provided. One or more cached subsets may be provided. In some embodiments, the provided subset includes the component provided in 408 of FIG. 4. In some embodiments, providing the cached subset includes providing the cached portion as a response to the request for the requested content. For example, a client that made the request for the requested content receives the cached executable subset and starts executing the cached executable subset before the cached executable subset has been verified as being valid. In some embodiments, provided the cached subset is executable content that is known to be validly pre-executable without the need to invalidate the pre-execution (e.g., executable content component that has been explicitly marked by a developer/content provider as pre-executable, executable content component identified to be not requiring invalidation, etc.).

In some embodiments, providing the cached subset includes providing webpage content that includes an injected nanovisor (e.g., fast-delivery webpage that includes the nanovisor). The provided webpage content may include the cached subset to be pre-executed and/or the webpage content may reference the cached subset to be subsequently requested/received. In some embodiments, the nanovisor manages the pre-execution. For example, the nanovisor instructs a web browser to execute the cached subset in a protected sandboxed environment (e.g., instructs a web browser to execute the cached executable subset using a separate new worker thread of a hidden browser tab). By separating allowing the cached executable content to execute in a separate environment as compared to using a main thread of the browser environment handling the requested content, the separate protected environment may be easily discarded without the need to reload/refresh the entire requested webpage content environment in the event the provisional execution needs to be invalidated. In some embodiments, the nanovisor coordinates which executable content component/subset is to be executed in which environment. For example, the executable content component that is identified for committed pre-execution is allowed by the nanovisor to execute within the main thread/environment of the web browser while the executable content component that is identified for provisional pre-execution is instructed by the nanovisor to execute within a protected/sandboxed thread/environment of the web browser. In some embodiments, the cached executable content component that has been not identified for pre-execution is provided to be cached by a client without pre-execution. For example, the nanovisor places the cached executable content component in a browser cache without allowing a web browser to pre-execute the cached executable content component prior to receiving an instruction that the browser cached executable content component is valid for execution.

In some embodiments, the nanovisor may be used to selectively suppress or prevent certain effects that are caused by the cached content component being sent in advance. In one embodiment, the content component is placed in an iframe. The <iframe> tag specifies an inline frame which is used to embed another document within the current HTML document. Attributes of the iframe may be set in such a way that some of the functions or features are disabled; for example, an attribute may be set to turn off visibility. When web browser 102 renders this iframe with visibility attribute set to OFF, content embedded within the iframe is merely loaded into the local cache. Rendering of the content of the iframe can be enabled again by deleting the iframe or setting the visibility attribute to ON.

In some embodiments, the cached subset of the requested content is provided for pre-execution in an optimized order. For example, the order of components of a webpage/web content to be loaded and/or executed is reorganized in an optimized order. Obtaining resources and/or executing executable content in a specified order of the original code of the webpage/web content may not be optimal for rendering the webpage/web content as soon as possible and/or correctly. For example, the provided cached subset may need to be executed in a certain reordered order with respect to other content components to function correctly as intended in the requested content. In some embodiments, the ordering in which components should be obtained/executed is reordered and optimized based at least in part on one or more of the following: an order of resources requested/executed for the webpage, an observed order of components placed in a DOM, sizes of the components, a maximum number of possible concurrent connections, a parameter/setting of the browser being utilized, a type of browser being utilized, visual importance of the components, utilization frequencies of the components, and other properties/information about the components. The reordering may be facilitated by a nanovisor and/or intermediary server 302 that reorders code, components, and/or execution process of the web content to achieve the desired ordering.

At 510, the requested content is received from the origin content server. For example, the content requested in 504 is received. In some embodiments, the received content is the content received in 410 of FIG. 4.

At 512, it is determined whether the pre-execution is to be abandoned/invalidated. In some embodiments, it is determined whether a change, if any, in the requested content may require the pre-execution to be invalidated/abandoned. For example, the received requested content is compared with a version of the requested content included in the cached content subset. In some embodiments, the received content in 510 is compared with the cached content subset provided in 508 to determine whether the cached content subset has changed. For example, the cached content subset has changed if the corresponding content of the cached content subset in the received requested content includes different content, does not exist, and/or is in a different location within the received requested content. In some embodiments, it is determined that the cached content subset has changed if any content of the newly received requested content has changed from a version of the cached content from which the cached content subset was cached.

In some embodiments, if the cached content subset has changed since a previous version of the cached content subset, the pre-execution is to be abandoned and if the cached content subset has not changed, the pre-execution is to be validated. In some embodiments, even though the cached content subset and/or the requested content has changed from a previous version of the cached content subset, the change is determined to not invalidate the pre-execution and the pre-execution is not to be abandoned. In some embodiments, steps 512-516 are optional. For example, only known to be valid pre-executions (e.g., committed pre-execution) are performed. In some embodiments, if the cached content subset was provided for browser caching but not pre-execution and it has been determined that the cached content subset has not changed in the received requested content, the cached content subset is instructed to be executed. In some embodiments, the result of the determination 512 is utilized to determine whether to cache, pre-execute, provisionally pre-execute, and/or committed pre-execute the content subset in response to future requests for the requested content.

If at 512 it is determined that the pre-execution is to be abandoned, at 514 an instruction is provided to abandon the pre-execution. One or more pre-executions may be abandoned. In some embodiments, abandoning the pre-execution includes not committing and/or undoing changes made by the pre-execution. In some embodiments, the providing the instruction includes requesting a web browser to reload/refresh the requested content request. For example, the entire webpage requested by the web browser in 502 is requested to be reloaded. In some embodiments, providing the abandonment instruction includes providing the instruction to the nanovisor that is managing the pre-execution. In some embodiments, the providing the instruction includes providing the instruction to only abandon the provisional execution of the pre-executed content portion. For example, when the instruction is received by a client/web browser/nanovisor, a worker thread and/or protected sandboxed environment of a provisional execution of the pre-execution is discarded.

In some embodiments, rather than abandoning the entire pre-execution, a difference between a cached version of the executable content component and the updated version of the executable content component in the received requested content is determined to determine corrective instructions (e.g., code/script, etc.) that can be provided to correct the cached version of the executable content component. The corrective instructions may be provided to the client for execution (e.g., and process proceeds to 516) instead of abandoning the pre-execution or instructing the client to reload the entire requested content. In some embodiments, if it is determined that the cost of processing and/or determining the corrective instructions outweighs the cost of abandoning the entire pre-execution and/or having the client refresh/reload the entire requested content, the pre-execution is abandoned and/or the entire requested content is instructed to be reloaded instead. For example, intermediary server 302 may further determine whether there are any side-effects or errors associated with the extraneous or incorrect content as compared to the requested content received from server 106 of FIG. 3. Based on different criteria, intermediary server 302 may make a determination as to whether further actions should be taken to undo or correct any effects caused by the extraneous content. The criteria considered may include the time and computation resources required to correct the effects, the degree of severity of the errors or side-effects, the extent to which the side-effects and errors are perceivable by the end-users, and the like. In one embodiment, if the side-effect or errors are determined to be objectionable to the end-users, web browser 102 may be directed to refresh or reload the webpage again.

If at 512 it is determined that the pre-execution is to be validated, at 516 an instruction is provided to validate the pre-execution. One or more pre-executions may be validated. In some embodiments, the providing the validation instruction includes allowing a web browser to continue execution by not sending a content refresh/reload request. In some embodiments, providing the validation instruction includes providing the instruction to the nanovisor that is managing the pre-execution. In some embodiments, when the validation instruction is received by a client/web browser/nanovisor, a result of a worker thread and/or sandboxed environment of a provisional execution of the pre-execution is added/merged with the environment of the main environment/thread. For example, rendering results/environments (e.g., including variables and execution states/environments) are merged. In some embodiments, when the validation instruction is received, results of the pre-execution are committed.

At 518, remaining components of the requested content not already provided and/or abandoned/invalidated are identified and provided. For example, any portions of the content received in 510 but not provided in 508 and/or abandoned/invalidated in 514 are identified and provided for execution/rendering. In some embodiments, steps 412 and 414 of FIG. 4 are included in 518.

Figure 6:
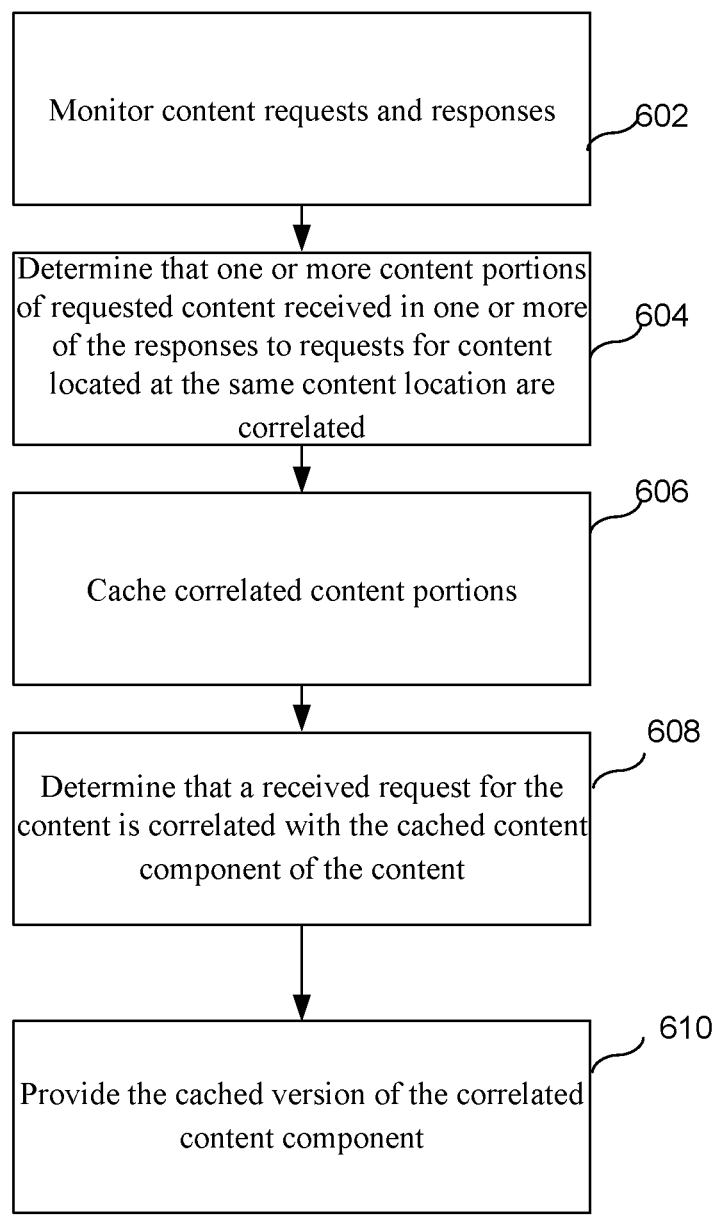
FIG. 6 is a flowchart illustrating an embodiment of a process for correlating responses to requests for content.

FIG. 6 is a flowchart illustrating an embodiment of a process for correlating responses to requests for content. In some embodiments, the process of FIG. 6 is implemented on intermediary server 302 of FIG. 3.

At 602, content requests and responses are monitored. In some embodiments, monitoring the requests and the responses includes receiving the requests for requested content and receiving corresponding responses that include the requested content. For example, intermediary server 302 of FIG. 3 monitors requests from one or more clients and corresponding responses to the same content. In some embodiments, monitoring content requests and responses includes receiving a request for content from a requestor, requesting the requested content from an origin content provider, receiving the requested content from the content origin provider, and providing the received requested content to the requestor. In some embodiments, monitoring the requests and the responses includes identifying which dynamic content was requested and analyzing responsive content received from a content origin server. In some embodiments, monitoring the requests and the responses includes performing analysis performed in 412 of FIG. 4 and/or 512 of FIG. 5. In some embodiments, all content requests and corresponding received responses that are handled by an intermediary server (e.g., edge server of a CDN) are monitored. In some embodiments, only a selected subset of content requests and corresponding responses received that are handled by an intermediary server are monitored. In some embodiments, only requests and responses for dynamic content are monitored to determine the ability to cache and/or pre-execute one or more portions of the dynamic content.

At 604, it is determined that one or more content portions of requested content received in one or more of the responses to requests for content located at the same content location are correlated. In some embodiments, determining that the one or more content portions are correlated includes identifying one or more content portions that do not change across one or more responses. For example, although dynamic content is not cacheable in its entirety, portions of requested dynamic content that do not change in content from one response to the next response are identified. In some embodiments, determining that one or more content portions of one or more responses are correlated includes identifying one or more same/similar content portions that are located at a same relative location across one or more responses. For example, although included data of a content portion has not changed, by changing the location of the content portion within the content, the effect of the content portion on the entire content may be altered. This may mean that although included data of a content portion has not changed across responses, the content portion is not correlated across the response because the location of the content portion relative to other content portions within a requested content may differ.

In some embodiments, correlating the one or more content portions of one or more of the responses includes correlating only responses for one or more selected requestors. For example, although certain content portions of responses to requests for the content may vary across various users/requestors, the certain content portions may be correlated (e.g., same) across responsive content for requests from the same user/requestor and/or from a group of similar users/requestors. In some embodiments, correlation across a single requestor, a group of similar requestors (e.g., requestors associated with similar/same geographical location, network location, organization, edge server, user attribute, etc.) and/or all requestors is tracked for the same content (e.g., content identified by same URI). For example, different content portions of the same content may be correlated for a single requestor as compared to a group of similar requestors or all requests for the same content.

In some embodiments, correlating the one or more content portions of one or more of the responses includes identifying one or more content portions that are correlated to be pre-executable. For example, specific types of executable content portions are known/eligible to be pre-executable and correlated content portions that include pre-executable content are identified. In another example, a content portion is only identified as pre-executable in the event the content portion includes executable content and included data has not changed across a select group of responses to the requests for the same content.

In some embodiments, correlating the one or more content portions of one or more of the responses includes identifying a predicted probability for each of the one or more content portions will remain valid (e.g., will not change) in a response for a future request. For example, a probability that the content portion can be cached and provided for in response to a subsequent request for browser caching, use and/or pre-execution without invalidating the content portion because the content portion has changed since being cached is identified. In some embodiments, an observed statistic (e.g., percentage) that a specific content portion of a requested content has changed within a period of time and/or number of requests for the requested content is determined.

Based on the predicted probability and/or the observed statistic, a correlated content portion may be identified as cacheable, provisionally pre-executable, and/or validly pre-executable. For example, in the event an indicator of the predicted probability and/or the observed statistic is within a first range (e.g., above a caching threshold but below a valid threshold), the content portion is identified as cacheable and provisionally pre-executable, and in the event the indicator is within a second range (e.g., above the valid threshold), the content portion is identified as cacheable and committed pre-executable. In some embodiments, a committed pre-executable content portion is allowed to pre-execute within a main browser context environment (e.g., in a main thread environment and not in a protected sandboxed environment of a worker thread) while a provisionally pre-executable content portion is to be executed by a client in a separate protected environment with the ability to invalidate the pre-execution. In some embodiments, determining whether a correlated content portion is cacheable or pre-executable includes determining whether the content portion is executable without affecting processing and/or results of other content portions.

At 606, correlated content portions are cached. In some embodiments, the content portions are cached at a cache storage of a proxy server (e.g., server 302 of FIG. 3). In some embodiments, a cached content portion is identified in the cache storage as being only correlated to requests by a specific user(s)/requestor(s), a specific group(s) of users/requestors, and/or all requestors. For example, a content portion may be only correlated to a specific user(s)/requestor(s), a specific group(s) of users/requestors, or all requestors. In some embodiments, a cached content portion is identified in the cache storage as being pre-executable. In some embodiments, a pre-executable cached content portion is identified in the cache storage as being either provisionally pre-executable or committed/validly pre-executable. In some embodiments, caching the correlated content portions includes configuring a time-to-live (TTL) validity time of each content portion. In some embodiments, the TTL is dynamically determined based on the predicted probability and/or the observed statistic determined in 604. For example, a highly correlated content portion is given a longer TTL while a less correlated content portion is given a shorter TTL.

At 608, a received request for the content is determined to be correlated with the cached content component of the content. In some embodiments, the request is the request received in 402 and the correlation determination is made in 406 of FIG. 4. In some embodiments, the request is the request received in 502 and the correlation determination is made in 506 of FIG. 5. In some embodiments, determining that the request is determined to be correlated with a cached content component includes identifying a user and/or requestor that requested the content and identifying eligible correlated content components for the specific user/requestor.

At 610, the cached version of the correlated content component is provided. In some embodiments, the provided cached component is the component provided in 408 of FIG. 4 and/or 508 of FIG. 5. In some embodiments, providing the correlated content component includes allowing the recipient of the correlated content component to pre-execute the content component. In some embodiments, providing the correlated content component includes instructing the recipient of the correlated content component to provisionally pre-execute or committed pre-execute the content component.

Figure 7:
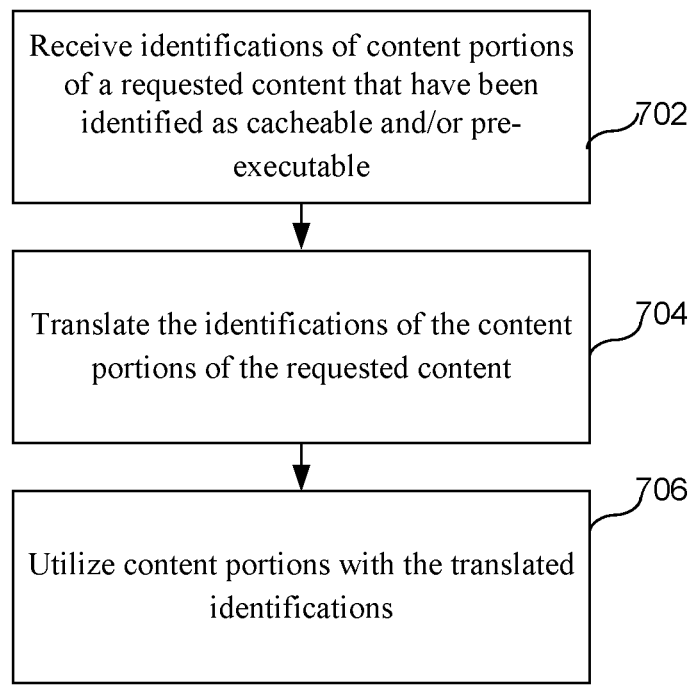
FIG. 7 is a flowchart illustrating an embodiment of a process for translating tagged executable content.

FIG. 7 is a flowchart illustrating an embodiment of a process for translating tagged executable content. In some embodiments, the process of FIG. 7 is implemented on intermediary server 302 of FIG. 3.

At 702, identifications of content portions of a requested content that have been identified as cacheable and/or pre-executable are received. In some embodiments, the identifications are included as tags within the requested content. For example, a developer and/or content provider has specifically identified one or more sections of provided dynamic content as cacheable and/or pre-executable (e.g., identified as provisionally pre-executable (sandbox pre-execution) or validly pre-executable (pre-execution without sandbox)). Rather than relying on inferred analysis of which content components of a dynamic content are cacheable/pre-executable (e.g., using the analysis performed in 406 of FIG. 4, 506 of FIG. 5, and/or 604 of FIG. 6) that may be incorrect, the received identification definitively identifies specific content portions as intended. In some embodiments, the requested content is the content requested in 402 of FIG. 4, 502 of FIG. 5, and/or 602 of FIG. 6. In some embodiments, the identifications of content portions identify a preferred execution ordering of the content portions. For example, desired pre-execution ordering of the content portions is identified by the identifications.

In some embodiments, the identifications are custom tags that extend or do not conform to standard tags encoding the requested content. For example, the identifiers are added to standard tags to extend HTML and/or other programming/scripting language tags to encode the identification. In one example, the identifier "provisionally pre-execute" is added to traditional tag "<script>" to form tag "<provisionally pre-execute script>" (e.g., </provisionally pre-execute script>" ends provisional pre-execution). In another example, the identifiers are added as standalone tags that does not conform to standard tags encodings (e.g., tags "<provisionally pre-execute>" and "</provisionally pre-execute>" are added). Because these custom identifier tags may not conform to HTML or other protocol/language understood by a client/web browser, the custom identifier tags may need to be translated and/or removed from the requested content before being cached and/or provided to a client. In some embodiments, the identification may identify pre-executable content as either provisionally pre-executable or committed/validly pre-executable.

At 704, the identifications of the content portions of the requested content are translated. For example, content tagged using custom/non-standard tags that identify the ability to be cached/pre-executed are translated to conventional tags able to be processed by a client (e.g., conforms to standardized tags of a markup/programing/scripting language understood by a standard web browser). In some embodiments, translating the identification includes removing the identifications from the requested content. For example, a portion of a tag or an entire tag may be removed. In some embodiments, translating the identification includes replacing/modifying the identification to a corresponding tag of a standardized markup/programing/scripting language.

At 706, content portions with the translated identifications are utilized. In some embodiments, utilizing the content portions with the translated identifications includes providing the content portions to a client in response to a request for the requested content. For example, the content portions with the translated identifications are provided in 602 of FIG. 6, 414 of FIG. 4, and/or 518 of FIG. 5. In some embodiments, utilizing the content portions with the translated identifications includes caching the content portions that have been identified by the identifiers as cacheable. For example, the content portions with the translated identifications are the correlated content portions cached in 606 of FIG. 6. The cached translated content component may be identified within the cache and/or in a separate data structure as being identified as cacheable, pre-executable, provisionally pre-executable, committed pre-executable, etc. In some embodiments, utilizing the content portions with the translated identifications includes providing one or more of the content portions for pre-execution. For example, the translated content portions that have been identified pre-executable are cached and provided for pre-execution in response to a subsequent request for the requested content (e.g., provided in 408 of FIG. 4, 508 of FIG. 5, 610 of FIG. 6, etc.). In some embodiments, the translated content portions are provided for pre-execution in an order at least in part specified/determined by the received identifications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for translating a content tag, comprising:
a communication interface configured to receive dynamic content that includes one or more identification tags, wherein at least one of the one or more identification tags identify one or more cacheable portions of the dynamic content, the received dynamic content includes a not desired to be cached content portion and at least one of the one or more identification tags identifies the one or more cacheable portions of the received dynamic content that do not belong to the content portion that is not desired to be cached, and at least one of the one or more identification tags identify a portion of the dynamic content that includes executable content to be programmatically executed as provisionally programmatically executable by a web browser prior to confirming that the portion that includes the executable content to be programmatically executed is valid; and
a processor coupled with the communication interface and configured to:
translate the one or more identification tags within the received dynamic content to generate a conventional version of the received dynamic content; and
provide the generated conventional version of the received dynamic content.

2. The system of claim 1, wherein confirming that the portion that includes the executable content to be programmatically executed is valid includes receiving from a server via a network a data that confirms that the portion that includes the executable content to be programmatically executed is valid.

3. The system of claim 1, wherein translating the one or more identification tags includes removing the one or more identification tags.

4. The system of claim 1, wherein translating the one or more identification tags includes modifying the one or more identification tags to conform to a standardized conventional language.

5. The system of claim 1, wherein providing the generated conventional version of the received dynamic content includes caching a portion of the generated conventional version identified by at least one of the one or more identification tags as being cacheable.

6. The system of claim 1, wherein providing the generated conventional version of the received dynamic content includes providing the generated conventional version in response to a request for the dynamic content.

7. The system of claim 1, wherein the dynamic content includes one or more identification tags identifying one or more pre-executable portions of the dynamic content.

8. A method for translating a content tag, comprising:
receiving dynamic content that includes one or more identification tags, wherein at least one of the one or more identification tags identify one or more cacheable portions of the dynamic content, the received dynamic content includes a not desired to be cached content portion and at least one of the one or more identification tags identifies the one or more cacheable portions of the received dynamic content that do not belong to the content portion that is not desired to be cached, and at least one of the one or more identification tags identify a portion of the dynamic content that includes executable content to be programmatically executed as provisionally programmatically executable prior to confirming that the portion that includes the executable content to be programmatically executed is valid;
using a processor to translate the one or more identification tags within the received dynamic content to generate a conventional version of the received dynamic content; and
providing the generated conventional version of the received dynamic content.

9. The method of claim 8, wherein confirming that the portion that includes the executable content to be programmatically executed is valid includes receiving from a server via a network a data that confirms that the portion that includes the executable content to be programmatically executed is valid.

10. The method of claim 8, wherein translating the one or more identification tags includes removing the one or more identification tags.

11. The method of claim 8, wherein translating the one or more identification tags includes modifying the one or more identification tags to conform to a standardized conventional language.

12. The method of claim 8, wherein providing the generated conventional version of the received dynamic content includes caching a portion of the generated conventional version identified by at least one of the one or more identification tags as being cacheable.

13. The method of claim 8, wherein providing the generated conventional version of the received dynamic content includes providing the generated conventional version in response to a request for the dynamic content.

14. The system of claim 8, wherein the dynamic content includes one or more identification tags identifying one or more pre-executable portions of the dynamic content.

15. A computer program product for translating a content tag, the computer program product being embodied in a non-transitory computer readable storage medium and comprising computer instructions for:
receiving dynamic content that includes one or more identification tags , wherein at least one of the one or more identification tags identify one or more cacheable portions of the dynamic content, the received dynamic content includes a not desired to be cached content portion and at least one of the one or more identification tags identifies the one or more cacheable portions of the received dynamic content that do not belong to the content portion that is not desired to be cached, and at least one of the one or more identification tags identify a portion of the dynamic content that includes executable content to be programmatically executed as provisionally programmatically executable prior to confirming that the portion that includes the executable content to be programmatically executed is valid;
translating the one or more identification tags within the received dynamic content to generate a conventional version of the received dynamic content; and
providing the generated conventional version of the received dynamic content.

16. The computer program product of claim 15, wherein confirming that the portion that includes the executable content to be programmatically executed is valid includes receiving from a server via a network a data that confirms that the portion that includes the executable content to be programmatically executed is valid.

17. The computer program product of claim 15, wherein translating the one or more identification tags includes removing the one or more identification tags.

18. The computer program product of claim 15, wherein translating the one or more identification tags includes modifying the one or more identification tags to conform to a standardized conventional language.

19. The computer program product of claim 15, wherein providing the generated conventional version of the received dynamic content includes caching a portion of the generated conventional version identified by at least one of the one or more identification tags as being cacheable.

20. The computer program product of claim 15, wherein providing the generated conventional version of the received dynamic content includes providing the generated conventional version in response to a request for the dynamic content.

* * * * *